US008364564B2

(12) United States Patent
Delany et al.

(10) Patent No.: US 8,364,564 B2
(45) Date of Patent: Jan. 29, 2013

(54) METHOD FOR USAGE BILLING IN AN INTERNET ENVIRONMENT

(75) Inventors: Douglas G. Delany, Tigard, OR (US); Bhagyam Moses, Portland, OR (US); Burzin A. Patel, Miami Lakes, FL (US)

(73) Assignee: International Business Machines Corporation, Armonk, NY (US)

( * ) Notice: Subject to any disclaimer, the term of this patent is extended or adjusted under 35 U.S.C. 154(b) by 134 days.

(21) Appl. No.: 12/143,402

(22) Filed: Jun. 20, 2008

(65) Prior Publication Data

US 2008/0319883 A1 Dec. 25, 2008

Related U.S. Application Data

(63) Continuation of application No. 09/656,320, filed on Sep. 6, 2000, now abandoned.

(51) Int. Cl.
*G06F 15/02* (2006.01)
*G06F 17/00* (2006.01)

(52) U.S. Cl. .......................................... 705/32; 705/412

(58) Field of Classification Search ..................... 705/32
See application file for complete search history.

(56) References Cited

U.S. PATENT DOCUMENTS

| | | | |
|---|---|---|---|
| 5,065,393 A | 11/1991 | Sibbitt et al. | |
| 5,745,884 A | 4/1998 | Carnegie et al. | |
| 5,822,410 A | 10/1998 | McCausland et al. | |
| 5,845,267 A | 12/1998 | Ronen | |
| 5,864,604 A | 1/1999 | Moen et al. | |
| 5,881,234 A | 3/1999 | Schwob | |
| 5,930,772 A | 7/1999 | Gomyo et al. | |
| 5,943,656 A | 8/1999 | Crooks et al. | |
| 5,944,795 A | 8/1999 | Civanlar | |
| 5,956,697 A | 9/1999 | Usui | |
| 5,987,430 A | 11/1999 | Van Horne et al. | |
| 6,012,034 A * | 1/2000 | Hamparian et al. | 705/2 |
| 6,035,281 A * | 3/2000 | Crosskey et al. | 705/14.69 |
| 6,104,704 A | 8/2000 | Buhler | |
| 6,119,160 A | 9/2000 | Zhang et al. | |
| 6,230,144 B1 | 5/2001 | Kikki et al. | |
| 6,389,541 B1 | 5/2002 | Patterson | |
| 6,405,251 B1 | 6/2002 | Bullard et al. | |
| 6,505,201 B1 | 1/2003 | Haitsuka et al. | |
| 7,797,236 B1 * | 9/2010 | Liu et al. | 705/40 |
| 2001/0027449 A1 * | 10/2001 | Wright | 705/412 |
| 2001/0034831 A1 | 10/2001 | Brustoloni et al. | |

FOREIGN PATENT DOCUMENTS

| | | |
|---|---|---|
| JP | 2002032140 | 7/2000 |
| WO | 9819448 | 5/1998 |

OTHER PUBLICATIONS

Dialog's DialUnits: A Price Increase in Sheep's Clothing, Sep. 1998; p. 56.*

(Continued)

*Primary Examiner* — Garcia Ade
(74) *Attorney, Agent, or Firm* — Lieberman & Brandsdorfer, LLC

(57) ABSTRACT

The invention presents a novel and efficient method of facilitating accurate usage billing. In a multi-user service provider environment, using weighted records of web-server usage to determine each user's bill for services is provided. The invention provides for billing with a minimal amount of overhead on the web host, which will benefit the web host's profit margin. The invention utilizes three pieces of information to compute the amount of usage. The weights that are associated with the functions are determined in order to score the system resource utilization of the respective functions. The weights need to be determined only once during the entire life cycle of the application, and may be based on empirical data or determined through lab tests. The weight can be stored in a static file.

17 Claims, 2 Drawing Sheets

OTHER PUBLICATIONS

Dialog's DialUnits: A Price Increase in Sheep's Clothing, Sep 1998; p. 56.*

Bates, M. Dialog's Dial Units: A Price Increase in Shee's Clothing, Searcher; Sep. 1998; 6, 8; ProQuest Computing, p. 56-65.

* cited by examiner

METHOD FOR USAGE BILLING IN AN INTERNET ENVIRONMENT

CROSS REFERENCE TO RELATED APPLICATION(S)

The present application is a continuation of U.S. patent application Ser. No. 09/656,320 filed on Sep. 6, 2000, now pending, which is hereby incorporated by reference.

BACKGROUND OF THE INVENTION

1. Technical Field

This invention relates to a method of using weighed records of web-server usage in order to determine each user's bill for services.

2. Description of the Prior Art

Applicants Service Providers (ASPs), Internet Service Providers (ISPs) or other types of Online Service Providers (OSPs), commonly maintain websites or applications for their customers. This service is commonly called web hosting. Each website is associated with a web host. A web host may be a physical web server or a logical entity, referred to as a virtual web host (VWH). A virtual web host associated with a large web site may span multiple physical web servers. Conversely, several virtual web hosts associated with small web sites may share a single physical web server.

An ISP provides access to the Internet for individual users. An ASP on the other hand, may host one or several heterogenous applications and leases out their usage to customers. Typically, an ISP or ASP hosts small businesses and provides the tools and services to operate the business and the operations functions of these small businesses.

In either case, each virtual web host provides the functionality of a single physical web server in a way that is transparent to the client. The web sites hosted on a virtual web host share server resources, such as CPU cycles and memory, but are provided with all of the services of a dedicated web server. A virtual web host has one or more public virtual IP addresses that clients use to access content on the virtual web host. A web host is uniquely identified by its public IP address. When a content or function request is made to the virtual web host's virtual IP address, the virtual IP address is mapped to a private IP address, which points either to a physical server or to a software application or function identified by both a private IP address and a layer port number that is allocated to the function.

When an individual accesses the Internet, they usually do so through a service provider who is in charge of making the connection. In order for that to happen, a certain procedure has to be completed in advance so the service provider has the information needed for making the connection, and deciding a method of payment. Information needed for making the connection includes log-in names, passwords, and so on. The method of payment involves utilizing a credit card, or setting up direct withdrawal from an account with some financial institution such as a bank, with a bill of charges sent by mail, an invoice for services, and so on.

To charge users for accessing the Web, OSPs generally use one of two types of billing methods. Users are charged either by a flat rate or by connection time. The typical type of fee-charging system for providing the services mentioned above is not based on the fee-charging system of the Internet itself, but on the places or facilities which provide the service. Due to the inflexible characteristics of a superficial fee-charging system, such as by calculating elapsed time, it cannot be said that this kind of system is a fair and correct way of fee-charging, as would be, for example, a fee figured from whether or not a person actually used the Internet.

Time-based billing methods such as that described in PCT application number WO 98/19488 ('488) and XACCT usage software, charges the user for the actual time spent logged-on to the web host. The '488 application is directed toward billing for telephone calls during an Internet session. The described method uses the user's IP address to establish an association between the user and a phone call and then generates a bill to the user based upon the call's duration. The XACCT software obtains IP session and transaction information from routers, switches, firewalls, and web hosts. The software uses the information to bill a user based upon the time of usage which, is gathered from the aforementioned sources.

The fee-charging system of the Internet is based on the calculation of a host computer, with a result sent by a terminal server at the time of connecting, and when cutoff or clearing is complete. It cannot calculate the charge until the connection is cut. Therefore, having a predetermined fee (as mentioned above), or a fee base don the time of entering and leaving the place, with no consideration given to the actual connection time, accounts for a big proportion of the charges for the facilities, except for those using the Internet. The above-mentioned system is not an appropriate system of fee charging for those who desire a timely way to use the Internet.

However, in this environment, charging the customers (either individuals or small entities) a flat monthly fee, or a charge based on the amount of time that they are logged onto the web host is not fair, since some customers may use a web host's services more than others. The current method of billing may also results in losses to the web host since some customers may utilize the application much more than the web host expected when the contract was negotiated.

U.S. Pat. No. 6,035,281 ('281) is an attempt to equitably charge users for access to OSPs. The '281 patent billing formula consists of a function that is based upon the time of day that a user is connected, as well as, the amount of bandwidth that is used by the client. However, the billing method is not determined by the type of specific user activity on an OSP or the service provided by an OSP.

Therefore, there is an industry need for service providers to efficiently and equitably charge customers based upon the specific user's activity or OSP service provided.

Accordingly, various objectives of an invention meeting these needs would include all of the following:

1) providing an efficient and equitable method of facilitating an accurate usage model;
2) providing a system and method for billing with minimal overhead on the system that hosts the application; and
3) using weighted file records of web server usage to determine a user's bill.

SUMMARY OF THE INVENTION

The present invention meets each of the above-described objectives, and provides a method, system and article of manufacture for weighted-usage billing of customers based on the usage of a service provider's (either ISP or ASP) functions. The invention utilizes the web-server's log file along with user-logon information (i.e., user identification or ID) and pre-determined weights of the functions to compute a weighted average use, and accurately bills the user for the amount and type of functions utilized.

The present invention provides a method, system and article for billing users in a service provider environment comprising the following: assigning a weight to each of at least one webserver function; identifying at least one function accessed by a user from a file; determining a number of uses of each function by the user; and determining an amount of usage by combining the number of uses of the function with the function weight. The file referred to is, for example, a webserver function log file or a user log file. In addition, the determination of the amount of usage comprises multiplying the number of uses of the function by the function weight, and the total amount of usage for the user is determined by summing amounts of usage.

Although the invention is targeting to the ISP and ASP environment, the invention can be applied to any other solution where usage charges need to be computed based on an application function level granularity.

Other features and advantages of this invention will become apparent form the following detailed description of the presently preferred embodiment of the invention, taken in conjunction with the accompanying drawings.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings embodiment(s) where are presently preferred. It should be understood, however, that the invention is not limited to the precise arrangements and instrumentalities shown. In the drawings.

DESCRIPTION OF THE PREFERRED EMBODIMENT

Technical Background

The invention presents a novel and efficient method of facilitating accurate usage billing by use of weighted averaging. The invention provides for billing with a minimal amount of overhead on the web host, which will benefit the web host's profit margins.

Overview

The invention utilizes three pieces of information to compute the amount of usage. The pieces of information are: weights that are associated with at least one function accessed by the user (function weights), a file such as a web server's log file, and the user's logon information (user identification or ID). The invention can also be effectively applied to two, three or more functions.

The weights that are associated with the function are determined in order to score the system resource utilization of the respective functions. The function weights need to be determined only once during the entire life cycle of the application and may be based on empirical data or determined through lab tests. The function weights can then be stored in a static file.

Usage Collector Agent

Figure 1:
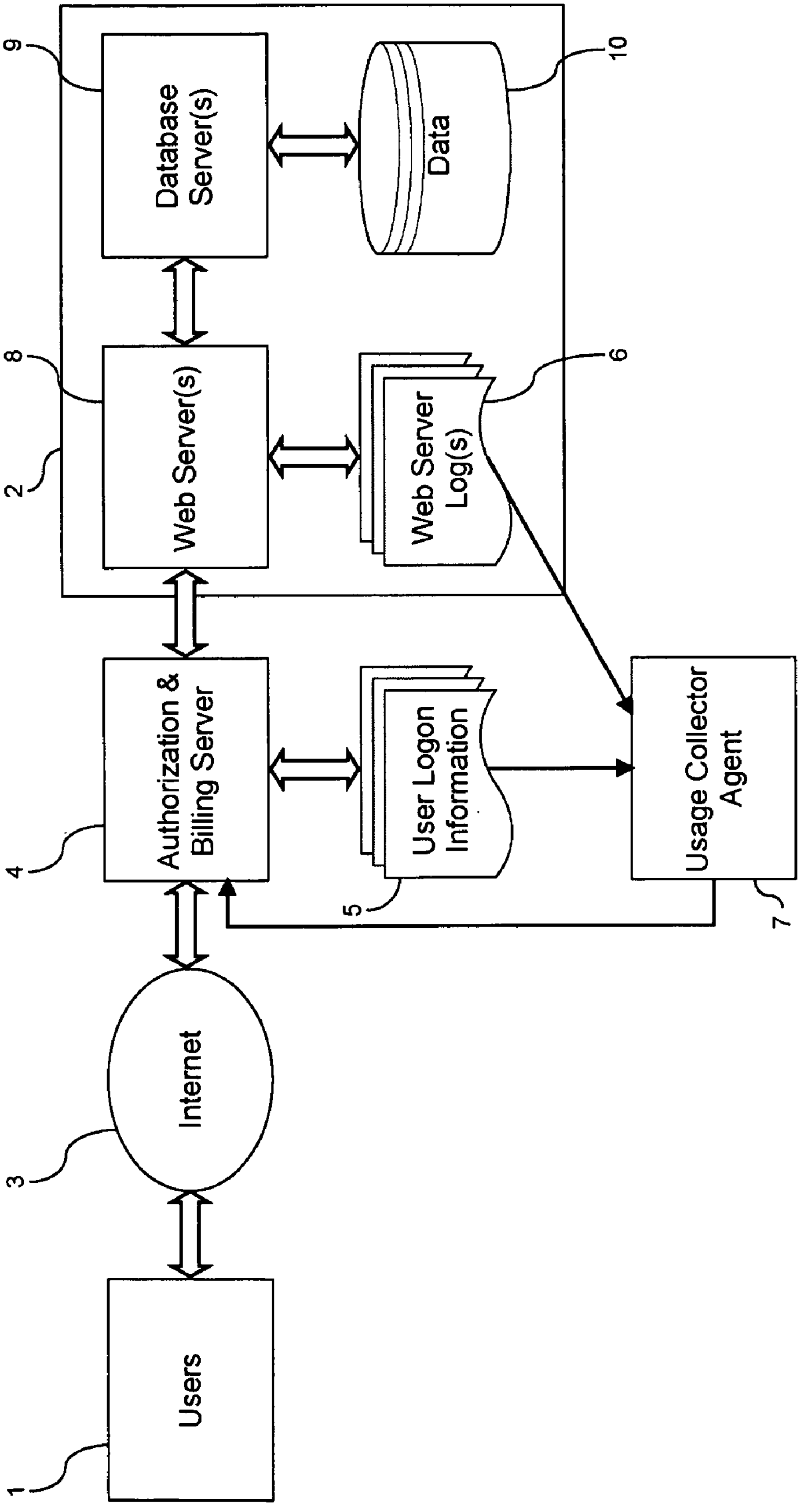
FIG. 1 is a block diagram of a Service Provider and Usage Collector Agent (UCA) according to the preferred embodiment of this invention, and is suggested for printing on the first page of the issued patent.

FIG. 1 depicts the service provider environment. The Users 1, access the Service Provider 2 through the Internet 3. The Internet 3 connects the User 1 to the Authorization and Billing Server 4, which records the logon information to the User logon information file 5. Within the User logon information files are records and details about the Users 1 who log on to the Service Provider 2. A single file entry is created each time a user logs on to the Service Provider 2.

The Web server log file 6 is collected, and is usually generated by default in order to create an audit trail. This file can be captured in one of many standard logging formats. The invention can utilize this file to extract the function usage information.

The invention Usage Collector Agent 7, which can be in either software or hardware form, stores the pre-assigned weights for the functions. The Usage Collector Agent 7 (UCA) can utilize either the Web Server log file 6 or the User log information 5 in order to assign weighted scores to either the amount of time a user is logged on, or the functions that are accessed by a particular user.

Figure 2:
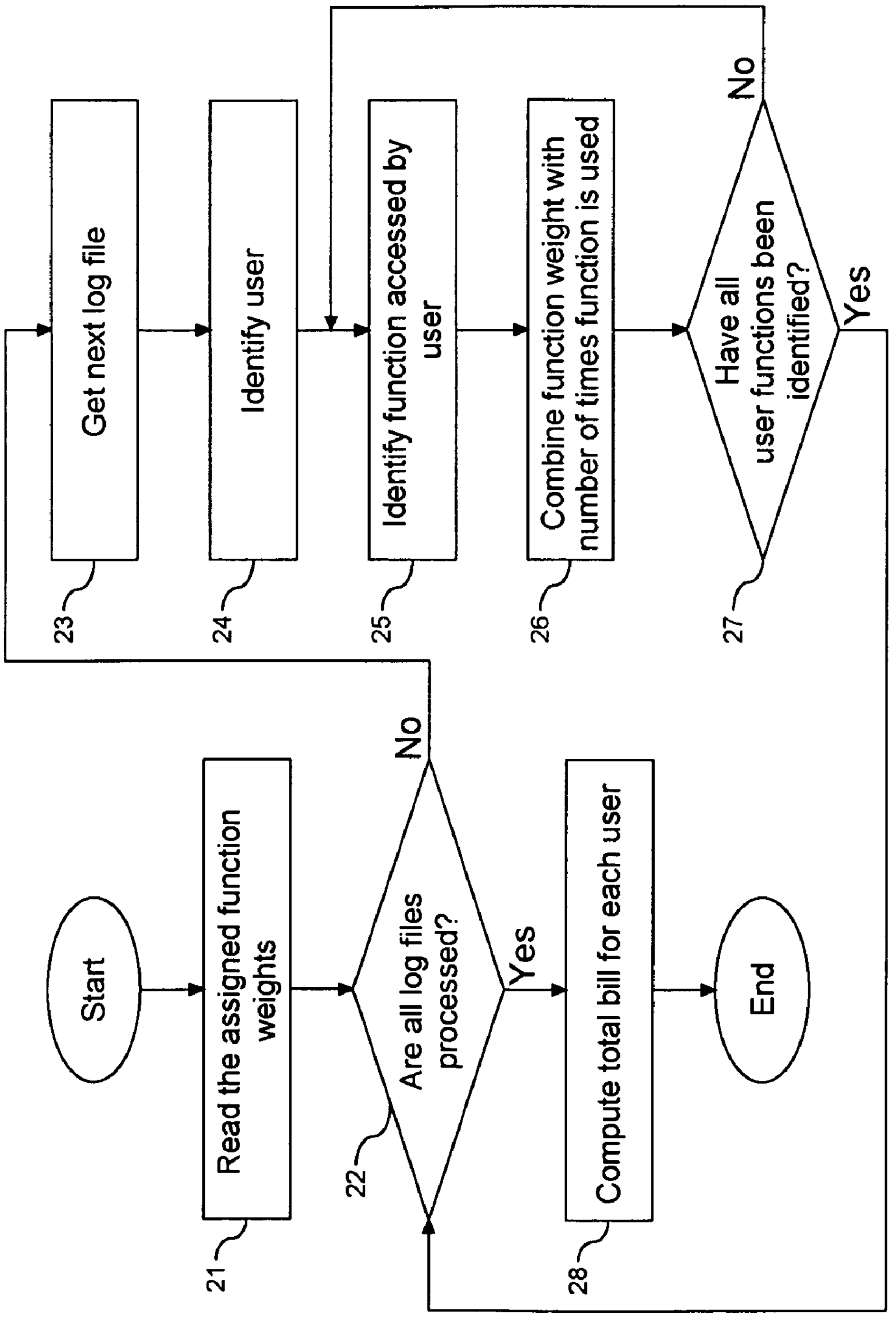
FIG. 2 is a block diagram of the UCA according to the preferred embodiment.

FIG. 2 is a block diagram that illustrates the preferred embodiment of the present invention. The OSP assigns weights to the various functions, which are stored by the OSP either on the web server or on backup files, step 21, that are used by the User Collection Agent 7. The UCA determines whether or not all of the log files have been processed, step 22. If there are remaining log files to be processed, the UCA retrieves the next log file, step 23. The user ID is obtained, step 24. The UCA next identifies the function accessed by the user, step 25 and then combines the function weight with the number of times the function was accessed by the user, step 26 until all of the functions for that user are identified, step 27. After all of the log files are processed, step 22, the UCA computes the total bill for each user, step 28.

Example

The invention is further described in detail by reference to the following experimental example. This example is provided for purposes of illustration only, and it not intended to be limiting unless otherwise specified. Thus, the invention should in no way be construed as being limited to the following examples, but rather, should be construed to encompass any and all variations which become evident as a result of the teaching provided herein.

The fees for the given time segment are first calculated based upon the amount of time the user is logged, and then is calculated using the present invention.

Assume that the following three users logon to the web-based online store. The user logon file for a particular time segment would resemble the following:

| User | Logon Time | User Session Identifier |
|---|---|---|
| User-A | 15:14 | UserASession123 |
| User-B | 14:28 | UserBSession456 |
| User-C | 16:20 | UserCSession789 |

Therefore, assuming the webhost charges $0.05 per minute, the total charges for the same User-A, User-B, and User-C, would be as follows:

| User | Charge |
|---|---|
| User-A | $0.76 |
| User-B | $0.71 |
| User-C | $0.81 |

The customer of a web host is an on-line retail store, which requires three functions: "Display Product Details," "Search for Product," and "Place an Order." The weights for these functions are assigned as follows:

| Function | Weight |
|---|---|
| Display Product Details | 1 |
| Search for Products | 5 |
| Place an Order | 11 |

Web hosts can determine weights in different ways. For instance, in the present example, the weights are determined based upon the fact that the "Display Product Details" function is a relatively light-weight operation, that demands very little utilization of system resources. Therefore, this function has a low weight associated with it. The "Search for Product" function requires searching through several products and filtering based on certain search criteria. This may result in higher utilization of the system resources as compared to the previous function and therefore, has a higher weight. The "Place an Order" function requires updates to several tables of the online retail store and complex payment handling transactions, all of which require intense use of the system resources. Therefore, this function has the highest weight associated with it.

For the time segment in consideration, the web server access log file would resemble the following:

| Function | Response Time | User Session Identifier |
|---|---|---|
| Display Product Details | 4 msec | UserBSession456 |
| Display Product Details | 6 msec | UserASession123 |
| Search for Product | 14 msec | UserASession123 |
| Display Product Details | 9 msec | UserCSession789 |
| Search for Product | 11 msec | UserBSession456 |
| Place Order | 33 msec | UserASessions123 |
| Display Product Details | 4 msec | UserCSession789 |
| Place Order | 28 msec | UserCSession789 |
| Search for Product | 12 msec | UserASession123 |
| Place Order | 34 msec | UserCSession789 |

Assuming a web host charges $0.05 per usage point, in the above time segment, the three users according to the invention would be billed as follows:

| User A | |
|---|---|
| Display Product Details: | 1 |
| Search for Product: | 2 |
| Place an Order | 1 |
| (1 × 1) + (2 × 5) + (1 × 11) = 22 usage points = $1.10 | |
| **User B** | |
| Display Product Details: | 1 |
| Search for Product: | 1 |
| Place an Order | 0 |
| (1 × 1) + (1 × 5) + (0 × 11) = 6 usage points = $0.30 | |
| **User C** | |
| Display Product Details: | 2 |
| Search for Product: | 0 |
| Place an Order | 2 |
| (2 × 1) + (0 × 5) + (2 × 11) = 24 usage points = $1.20 | |

These amount could be added to the respective user's bills.

The present invention provides an advantage over the previous methods or systems such as the time usage charges, in that it provides an accurate usage model with minimal overhead, effort or intrusion into the web host.

Alternative Embodiments

It will be appreciated that, although specific embodiments of the invention have been described herein for purposes of illustration, various modifications may be made without departing from the spirit and scope of the invention. In particular, although the invention is targeted to the ISP and ASP environment, it can be applied to any other solution where usage charges need to be computed based on an application function level granularity. The invention can be embodied as a method, system, or article in the form of computer-readable medium such as a recordable data storage medium. In yet another embodiment, the invention could be set up as a batch just that is set to run at preset intervals utilizing known methods in the art. Accordingly, only the following claims and their equivalents limit the scope of protection of this invention. They are intended to be construed to include all such embodiments and equivalent variations.

We claim:

1. A computer implemented method for billing comprising:

a server in communication with data storage, said server running an application, the application including at least two different functions;

the server executing instructions including:

prior to starting the application, determining a first weight score and a second weight score for assigning to a first and a second webserver function, respectively, said first and second weight scores based upon resource utilization demands associated with execution of the first and second functions respectively;

assigning the first weight score to the first webserver function and the second weight score to the second webserver function, said first weight score taking a first value and said second weight score taking a second value, both the first and the second weight scores remaining constant within a life cycle of the application, the first and second weight scores stored in said data storage prior to use of said function by a user;

identifying said user accessing said application;

identifying a number of times each of said first and second functions is accessed by said user;

calculating an amount of usage points for each of said first and second functions by multiplying the number of times each of said first and second functions is accessed by the user with the weight assigned to the first and second functions, respectively;

summing said calculated amount of usage points for all accessed functions at a preset interval; and multiplying said summation by a charge per usage point and billing said user for said multiplied summation at an end of the preset interval.

2. The method of claim 1, further comprising a webserver function log file to store said number of times each of said functions is accessed.

3. The method of claim 1, further comprising a user log file to store user access information of each of said functions.

4. A computer implemented system for billing a user in a service provider environment comprising:

a client machine in communication with a server, said server running an application, the application including at least two different webserver functions;

a first function weight assigned to a first webserver function and a second function weight assigned to a second webserver function prior to execution of said first and second functions, said first weight score taking a first value and said second weight score taking a second value, both the first and the second weight scores remaining constant within a life cycle of the application, said first and second weights based upon resource utilization demands associated with execution of the first and second functions respectively;

a client machine identification recorded by said application;

said first and second functions adapted to be accessed by the client machine;

a software manager local to the server adapted to track a number of uses of each of the first and second functions accessed by the client machine;

a fee calculation function local to the server based on an amount of usage points calculated by multiplying the number of uses tracked by said manager with the weight assigned to one of the first and second functions; and a batch function local to the server in communication with the fee calculation function to run at a preset time interval to periodically calculate the fee and to bill the client machine the calculated fee.

5. The system of claim 4, wherein the usage amount is determined by multiplying the number of uses of each of the functions by the weight assigned to that function.

6. The system of claim 5, further comprising a total amount of usage for the user by summing a quantity of said usage amount.

7. The system of claim 5, wherein the file is a webserver function log file.

8. The system of claim 5, wherein the file is a user log file.

9. An article for billing a user in a service provider environment comprising a computer-readable data storage medium storing instructions comprising:

instructions for preassigning a first weight to a first webserver implemented function and a second weight to a second webserver implemented function;

instructions for identifying at least one of said first and second functions accessed by the user;

instructions for calculating an amount of usage points based upon the number of uses for each accessed function and the weight assigned to each accessed function said first weight score taking a first value and said second weight score taking a second value, both the first and the second weight scores remaining constant within a life cycle of an application, said first and second weights based upon resource utilization demands associated with execution of the first and second functions respectively; and instructions for periodically calculating a user fee as a batch function based upon said amount of usage points, said batch function configured to run at a preset time interval to periodically calculate the fee and to bill the user the calculated fee.

10. The article of claim 9, wherein the instructions for calculating usage amount includes multiplying the number of uses of each of the functions by the weight assigned to the function.

11. The article of claim 9, further comprising instructions for determining a total amount of usage for the user by summing usage amounts.

12. The article of claim 9, wherein the file is a webserver function file.

13. The article of claim 9, wherein the file is a user log file.

14. The article of claim 9, wherein the medium is a recordable data storage medium.

15. The method of claim 1, wherein each weight is determined once during a life cycle of the software application.

16. The system of claim 4, wherein each weight is determined once during a life cycle of the software application.

17. The article of claim 9, wherein each weight is determined once during a life cycle of a software application.

* * * * *